(12) United States Patent
Ghannam et al.

(10) Patent No.: US 10,525,921 B2
(45) Date of Patent: Jan. 7, 2020

(54) MONITORING WINDSHIELD VIBRATIONS FOR VEHICLE COLLISION DETECTION

(71) Applicant: Ford Global Technologies, LLC, Dearborn, MI (US)

(72) Inventors: Mahmoud Yousef Ghannam, Canton, MI (US); Joshua Wheeler, Trenton, MI (US); Brian Bennie, Sterling Heights, MI (US); Scott Andrew Amman, Milford, MI (US); Doug B. Thornburg, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 15/674,155

(22) Filed: Aug. 10, 2017

(65) Prior Publication Data
US 2019/0047500 A1    Feb. 14, 2019

(51) Int. Cl.
| G01L 1/16 | (2006.01) |
|---|---|
| B60R 21/013 | (2006.01) |
| B60R 21/00 | (2006.01) |
| B60S 1/08 | (2006.01) |
| G01H 11/08 | (2006.01) |

(52) U.S. Cl.
CPC .... B60R 21/013 (2013.01); *B60R 2021/0004* (2013.01); *B60R 2021/0011* (2013.01); *B60S 1/0859* (2013.01); *G01H 11/08* (2013.01)

(58) Field of Classification Search
CPC .......... B60R 21/013; B60R 2021/0011; G01H 11/08; B60S 1/0859; G01L 1/16; H04W 4/21
See application file for complete search history.

(56) References Cited

U.S. PATENT DOCUMENTS

| 4,655,673 A | 4/1987 | Hawkes |
|---|---|---|
| 5,748,075 A | 5/1998 | Dirmeyer et al. |
| 6,057,660 A | 5/2000 | Meier et al. |
| 6,278,377 B1 | 8/2001 | Deline |

(Continued)

FOREIGN PATENT DOCUMENTS

| CN | 201731408 U | 2/2011 |
|---|---|---|
| CN | 104405272 B | 1/2016 |

(Continued)

OTHER PUBLICATIONS

Ruotsalainen et al., Wireless system for the continuous observation of whole-body vibration in heavy machinery, 2013, IEEE, p. 26-32 (Year: 2013).*

(Continued)

*Primary Examiner* — McDieunel Marc
(74) *Attorney, Agent, or Firm* — Frank Lollo; Eversheds Sutherland (US) LLP (57) ABSTRACT

An example vehicle for monitoring windshield vibrations for vehicle collision detection includes a windshield, a vibration sensor coupled to the windshield to detect window vibrations of the windshield, a first accelerometer to detect vehicle body vibrations of a vehicle body, and a restraint control module. The restraint control module is to detect an event based upon the window vibrations and determine whether the event is a collision event or a non-collision event responsive to comparing the window vibrations and the vehicle body vibrations.

20 Claims, 5 Drawing Sheets

(56) References Cited

U.S. PATENT DOCUMENTS

| | | | |
|---|---|---|---|
| 6,732,566 B2 | 5/2004 | Roelleke et al. | |
| 6,889,189 B2 | 5/2005 | Boman | |
| 7,016,836 B1 | 3/2006 | Yoda | |
| 7,149,318 B2 | 12/2006 | Bank et al. | |
| 7,475,587 B2* | 1/2009 | Kithil | G01L 1/16 73/12.09 |
| 7,516,645 B2* | 4/2009 | Kithil | G01L 1/16 73/12.09 |
| 7,697,698 B2 | 4/2010 | Brown | |
| 7,772,839 B2 | 8/2010 | Watson | |
| 7,853,026 B2 | 12/2010 | DeLine et al. | |
| 8,068,942 B2 | 11/2011 | Breed | |
| 8,077,022 B2 | 12/2011 | Baruco et al. | |
| 8,165,875 B2 | 4/2012 | Hetherington et al. | |
| 8,285,545 B2 | 11/2012 | Lee et al. | |
| 8,447,044 B2 | 5/2013 | Nongpiur et al. | |
| 8,515,095 B2 | 8/2013 | Bard | |
| 8,538,749 B2 | 9/2013 | Visser | |
| 8,682,005 B2 | 3/2014 | Watson et al. | |
| 8,724,832 B2 | 5/2014 | Stephanou et al. | |
| 8,849,656 B2 | 9/2014 | Schmidt et al. | |
| 8,996,383 B2 | 3/2015 | Rodemer | |
| 9,014,392 B2 | 4/2015 | Sato et al. | |
| 9,020,690 B2 | 4/2015 | McKown et al. | |
| 9,117,318 B2* | 8/2015 | Ricci | H04W 4/21 |
| 9,124,219 B2 | 9/2015 | Thormundsson | |
| 9,154,893 B1 | 10/2015 | Breed | |
| 9,218,698 B2* | 12/2015 | Ricci | H04W 4/21 |
| 9,263,040 B2 | 2/2016 | Tzirkel-Hancock et al. | |
| 9,317,983 B2* | 4/2016 | Ricci | H04W 4/21 |
| 9,330,684 B1 | 5/2016 | Kirsch | |
| 9,418,674 B2 | 8/2016 | Tzirkel-Hancock et al. | |
| 9,469,247 B2 | 10/2016 | Juneja et al. | |
| 9,539,984 B2 | 1/2017 | Dias | |
| 9,665,873 B2 | 5/2017 | Ackland | |
| 9,697,355 B1 | 7/2017 | Park | |
| 9,870,697 B2 | 1/2018 | Frew | |
| 2003/0209893 A1 | 11/2003 | Breed | |
| 2004/0246607 A1 | 12/2004 | Watson | |
| 2004/0260547 A1 | 12/2004 | Cohen | |
| 2005/0071159 A1 | 3/2005 | Boman et al. | |
| 2005/0074131 A1 | 4/2005 | McCall et al. | |
| 2005/0109075 A1* | 5/2005 | Kithil | G01L 1/16 73/12.09 |
| 2006/0184361 A1 | 8/2006 | Lieb | |
| 2007/0005206 A1 | 1/2007 | Zhang | |
| 2007/0086624 A1 | 4/2007 | Breed | |
| 2007/0104026 A1 | 5/2007 | Rubin | |
| 2007/0277622 A1* | 12/2007 | Kithil | G01L 1/16 73/775 |
| 2008/0040005 A1 | 2/2008 | Breed | |
| 2008/0129475 A1 | 6/2008 | Breed | |
| 2008/0175405 A1 | 7/2008 | Couvillon | |
| 2008/0226098 A1 | 9/2008 | Haulick | |
| 2008/0273711 A1 | 11/2008 | Broussard et al. | |
| 2009/0115635 A1 | 5/2009 | Berger | |
| 2009/0116661 A1 | 5/2009 | Hetherington | |
| 2009/0125311 A1 | 5/2009 | Haulick et al. | |
| 2009/0164147 A1* | 6/2009 | Kithil | G01L 1/16 702/42 |
| 2009/0216526 A1 | 8/2009 | Schmidt | |
| 2010/0239101 A1 | 9/2010 | Okamura | |
| 2012/0140946 A1 | 6/2012 | Yen | |
| 2012/0191447 A1 | 7/2012 | Joshi | |
| 2012/0299718 A1 | 11/2012 | Yoshino | |
| 2013/0053990 A1 | 2/2013 | Ackland | |
| 2013/0188794 A1 | 7/2013 | Kawamata | |
| 2013/0211828 A1 | 8/2013 | Gratke | |
| 2013/0308784 A1 | 11/2013 | Dickens et al. | |
| 2014/0294189 A1 | 10/2014 | Pan | |
| 2014/0306826 A1* | 10/2014 | Ricci | H04W 4/21 340/573.1 |
| 2015/0117155 A1 | 4/2015 | Jang et al. | |
| 2015/0139428 A1 | 5/2015 | Reining | |
| 2015/0156587 A1 | 6/2015 | Herbig et al. | |
| 2015/0239320 A1 | 8/2015 | Eisenhour et al. | |
| 2015/0365743 A1 | 12/2015 | Koningsberg et al. | |
| 2016/0019890 A1 | 1/2016 | Amman | |
| 2016/0019904 A1 | 1/2016 | Charette | |
| 2016/0119890 A1 | 1/2016 | Amman et al. | |
| 2016/0188285 A1 | 6/2016 | Luk | |
| 2016/0217689 A1 | 7/2016 | Young | |
| 2016/0267908 A1 | 9/2016 | Borjeson | |
| 2016/0299011 A1 | 10/2016 | Ihle | |
| 2016/0320840 A1 | 11/2016 | Hwang | |
| 2016/0355125 A1 | 12/2016 | Herbert | |
| 2017/0018127 A1 | 1/2017 | Yang et al. | |
| 2017/0088072 A1 | 3/2017 | Curtis | |
| 2017/0118556 A1 | 4/2017 | Macours | |
| 2017/0171679 A1 | 6/2017 | Isberg | |
| 2017/0345270 A1 | 11/2017 | Singh | |
| 2018/0113673 A1 | 4/2018 | Sheynblat | |
| 2018/0249250 A1 | 8/2018 | Pate | |

FOREIGN PATENT DOCUMENTS

| | | |
|---|---|---|
| CN | 103770736 B | 12/2016 |
| CN | 106341755 A1 | 1/2017 |
| DE | 10164509 A1 | 7/2003 |
| DE | 10254684 A1 | 6/2004 |
| DE | 102009046132 A1 | 5/2011 |
| DE | 102011003730 A1 | 7/2011 |
| EP | 1078818 A2 | 2/2001 |
| FR | 2825882 A1 | 12/2002 |
| JP | 3802897 B2 | 5/2006 |
| JP | 2010000963 A | 1/2010 |
| KR | 1020160150554 B1 | 6/1998 |
| KR | 101018783 B1 | 3/2011 |
| WO | WO 98/047109 A1 | 10/1998 |
| WO | WO 2013/90007 A1 | 6/2013 |

OTHER PUBLICATIONS

Bruel et al., Measuring Vibration, 1982, Internet, p. 1-40 (Year: 1982).*

Hafizi et al., Modal properties investigation of car body-in-white with attached windscreen and rear screen, 2019, Internet, p. (Year: 2019).*

Christian Bolzmacher et al., Transforming Car Glass Into Microphones Using Piezoelectric Transducers, Microsystem Technologies, Jul. 2016, vol. 22, Issue 7, 3 pages.

Karen M., Stickable Sound Pads Turn Any Surface Into a Speaker, Jul. 30, 2008, 4 pages.

Benson, K. Blair et al. Standard handbook of Audio and Radio Engineering. McGraw-Hill, 2002, p. 1-10.

Search Report dated Apr. 3, 2018 for Great Britain Patent Application No. GB 1716042.5 (3 Pages).

Piezo Acoustics: Turning Windows into Invisible Speakers and Helping James Bond Keep Secrets, 4 pages.

* cited by examiner

MONITORING WINDSHIELD VIBRATIONS FOR VEHICLE COLLISION DETECTION

TECHNICAL FIELD

The present disclosure generally relates to collision detection and, more specifically, to monitoring windshield vibrations for vehicle collision detection.

BACKGROUND

Typically, a vehicle includes seatbelts to restrain a position of an occupant within the vehicle. A vehicle also typically includes airbags (e.g., a driver airbag, a passenger airbag, a side-impact airbag, a side-curtain airbag, etc.) that deploy to further restrain an occupant when the vehicle is involved in a collision. The airbags are to be fully inflated within a short period of time of the collision being detected to enable the airbags to restrain the occupant throughout the duration of the collision. Oftentimes, a vehicle includes a restraint control module that detects whether the vehicle is involved in a collision, determines whether to deploy airbag(s) of the vehicle, and sends signal(s) to activate the airbag(s) upon determining to deploy the airbag(s).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for monitoring windshield vibrations for vehicle collision detection. An example disclosed vehicle includes a window, a vibration sensor coupled to the window to detect window vibrations of the window, a first accelerometer to detect vehicle body vibrations of a vehicle body, and a restraint control module. The restraint control module is to detect an event based upon the window vibrations and determine whether the event is a collision event or a non-collision event responsive to comparing the window vibrations and the vehicle body vibrations.

An example disclosed method includes detecting window vibrations of a window via a vibration sensor coupled to the window and detecting vehicle body vibrations of a vehicle body via a first accelerometer. The example disclosed method also includes detecting, via a processor, an event based upon the window vibrations and determining, via the processor, whether the event is a collision event or a non-collision event responsive to comparing the window vibrations and the vehicle body vibrations.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, a vehicle includes seatbelts to restrain a position of an occupant within the vehicle. A vehicle also typically includes airbags (e.g., a driver airbag, a passenger airbag, a side-impact airbag, a side-curtain airbag, etc.) that deploy to further restrain an occupant when the vehicle is involved in a collision. The airbags are to be fully inflated within a short period of time of the collision being detected to enable the airbags to restrain the occupant throughout the duration of the collision. Oftentimes, a vehicle includes a restraint control module that detects whether the vehicle is involved in a collision, determines whether to deploy airbag(s) of the vehicle, and sends signal(s) to activate the airbag(s) upon determining to deploy the airbag(s).

Some vehicles include sensors (e.g., pressure sensors, accelerometers) that are located throughout a body of the vehicle to detect whether the vehicle has been involved in a collision. In such vehicles, the sensors detect vibrations of the body of the vehicle to determine whether the vehicle is involved in a collision. That is, a collision is detected if the detected vibrations of the vehicle body exceed a particular threshold. In some instances, nearby non-collisions events, such as puncturing tires of nearby semi-trucks, emit a sound that is loud enough to vibrate the vehicle body above the particular threshold, thereby potentially causing airbags of the vehicle to deploy when the vehicle is not involved in a collision.

Example methods and apparatus disclosed herein monitor vibrations of a vehicle window (e.g., a windshield, a side window) caused by sound waves emitted by nearby event to determine whether a collision event or a non-collision event of the vehicle has occurred. Examples disclosed herein include a vehicle system that detects whether the vehicle is involved in a collision event by monitoring vibrations of a window (e.g., a windshield, a side window) of the vehicle. The vehicle system includes a vibration sensor (e.g., a piezoelectric accelerometer) that is coupled to the window to monitor vibrations of the window. When the vibration sensor is coupled to the window, the window functions as a diaphragm of a microphone that vibrates when sound waves (e.g., high-pressure sound waves) travel through the window. The vibration detects the sound waves by detecting the vibrations of the window that are caused by the sound waves. Further, a restraint control module of the vehicle collects signals from the vibration sensor that correspond to the detected vibrations. The restrain control module filters the signals, processes the signals, examines the signals in time and frequency domains, and compares the signals to criteria that correspond to sound wave sources. If the examined signals correspond to criteria corresponding with a collision event, the restraint control module activates one or more air bag(s) of the vehicle. If the examined signals correspond to criteria corresponding with a non-collision event (e.g., a nearby event that emits high-pressure sound waves), the restraint control module does not activate an airbag. Further, in some examples, the vibration sensor and the window may be utilized to detect sources of other sounds (e.g., animals, people, etc.) emitted near the vehicle.

Figure 1:
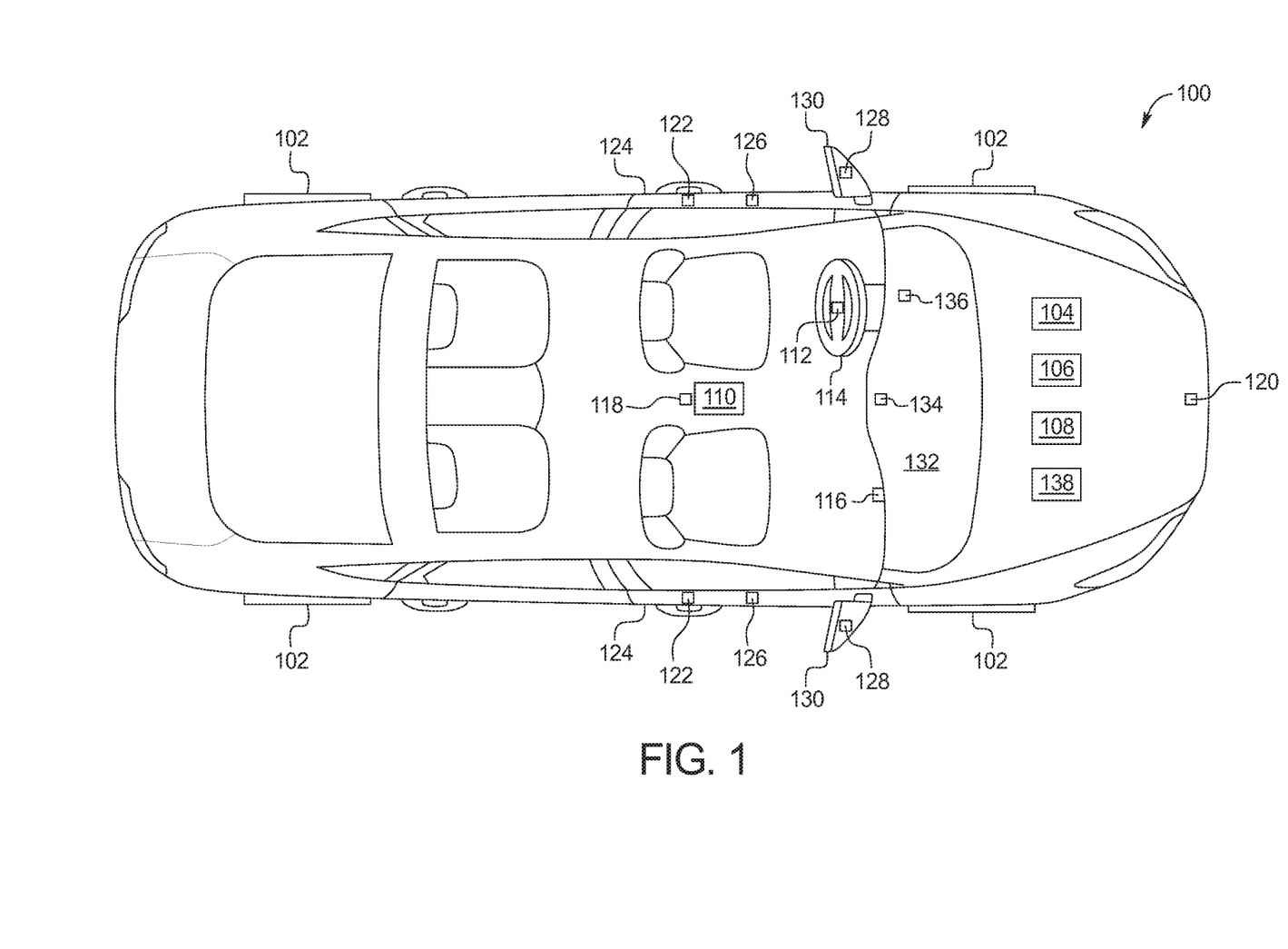
FIG. 1 illustrates an example vehicle in accordance with the teachings herein.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes tires 102, a global positioning system (GPS) receiver 104, a communication module 106, another communication module 108, and a restraint control module 110. For example, the GPS receiver 104 receives a signal from a global positioning system to identify a location of the vehicle 100. Further, the communication module 106 is configured to communicate with external networks, and the communication module 106 is configured to communicate via dedicated short-range communication.

The communication module 106 of the illustrated example includes wired or wireless network interfaces to enable communication with external networks. The communication module 106 also includes hardware (e.g., processors, memory, storage, antenna, etc.) and software to control the wired or wireless network interfaces. In the illustrated example, the communication module 106 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC), local area wireless network (including IEEE 802.11 a/b/g/n/ac or others), Wireless Gigabit (IEEE 802.11ad), etc.). In some examples, the communication module 106 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicated with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The communication module 108 of the illustrated example is configured to communicate via vehicle-to-vehicle (V2V) communication, vehicle-to-infrastructure (V2X) communication, and/or any other dedicated short-range communication (DSRC). For example, the communication module 108 is a DSRC module that includes antenna(s), radio(s) and software to broadcast messages and to establish connections between the vehicle 100 and another vehicle (V2V communication), infrastructure-based modules (V2X communication), and mobile device-based modules. More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure.

As illustrated in FIG. 1, the vehicle 100 also includes a restraint control module 110. The restraint control module 110 is an electronic control unit (ECU) that restrains position(s) of occupant(s) within the vehicle 100 upon detecting that the vehicle 100 is involved in a collision event. As used herein, a "collision event" refers to an event in which the vehicle 100 collides with and/or is collided with another vehicle and/or object. As used herein, a "non-collision event" refers to an event in which the vehicle 100 does not collide with and is not collided with another vehicle and/or object.

In the illustrated example, the vehicle 100 may have a plurality of ECUs (e.g., about seventy) that each is positioned at a location within the vehicle 100 to monitor and control subsystem(s) of the vehicle 100. For example, the ECUs, including the restraint control module 110, are discrete sets of electronics that include their own circuit(s) (e.g., integrated circuits, microprocessors, memory, storage, etc.) and firmware, sensors, actuators, and/or mounting hardware. The ECUs communicate and exchange information via a vehicle data bus (e.g., a vehicle data bus 504 of FIG. 5). Additionally, the ECUs may communicate properties (e.g., status of the ECUs, sensor readings, control state, error and diagnostic codes, etc.) to and/or receive requests from each other.

The restraint control module 110 of the illustrated example deploys one or more airbags within the vehicle 100 upon detecting that the vehicle 100 is involved in a collision event. Upon detecting a collision event, the restraint control module 110 deploys one or more airbags within the vehicle 100 to restrain the position(s) of the occupant(s) within the vehicle 100 during the collision event. In the illustrated example, the vehicle 100 includes an airbag 112 located within a steering wheel 114 to restrain a position of a driver during a collision event and includes another airbag 116 located in a dashboard to restrain a position of a front-seat passenger during a collision event. Additionally or alternatively, the vehicle 100 may include one or more other airbags such as side-impact airbag(s) and/or curtain airbag(s).

The restraint control module 110 determines which, if any, of the airbags (e.g., the airbag 112, the airbag 116) to deploy upon identifying a collision type, an angle of impact, a severity of impact, and/or any other characteristic of the collision event. For example, the restraint control module 110 deploys one or more airbag(s) if the collision event exceeds a severity threshold and does not deploy an airbag if the collision event does not exceed the severity threshold. In some examples, the restraint control module 110 determines which, if any, of the airbags (e.g., the airbag 112, the airbag 116) to deploy upon identifying which of the seats of the vehicle 100 are occupied. Further, upon detecting a collision event, the restraint control module 110 quickly causes one or more of the airbags to deploy to restrain the position(s) of the occupant(s) within the vehicle 100. In some examples, the restraint control module 110 determines which, if any, of the airbags are to be deployed within about 15 to 30 upon the onset of the collision event, and the airbag(s) are to be fully inflated with about 60 to 80 milliseconds upon the onset of the collision event to restrain the position(s) of the occupant(s) within the vehicle 100. For example, the restraint control module 110 send signals to trigger pyrotechnic process(es) and/or compressed air cylinder(s) that enable the restraint control module 110 to quickly deploy the airbags of the vehicle 100.

In some examples, the restraint control module 110 also controls seat belt mechanism(s) to further restrain the position(s) of the occupant(s) during the collision event. For example, upon detecting a collision event, the restraint control module 110 may activate a seat belt pretensioner to remove slack from the seat belt and/or a webclamp to clamp webbing of the seatbelt to limit a length of the seatbelt that the webbing is able to spool out.

The restraint control module 110 of the illustrated example determines which, if any, of the airbags (e.g., the airbag 112, the airbag 116) to deploy based upon information collected via one or more sensors (e.g., accelerometers, impact sensors, pressure sensors, wheel speed sensors, gyroscopes, brake pressure sensors, seat occupancy sensors, etc.) and/or other data source(s). For example, the vehicle 100 includes a center accelerometer 118 (e.g., a first accelerometer), a front accelerometer 120, and side accelerometers 122. For example, the center accelerometer 118, the front accelerometer 120, and the side accelerometers 122 are sensors that measure accelerations (e.g., proper accelerations within an instantaneous rest frame of the vehicle 100) and/or vibrations of the vehicle 100.

The center accelerometer 118, the front accelerometer 120, and the side accelerometers 122 of the illustrated example measure the accelerations and/or vibrations of the vehicle 100 to monitor for an occurrence, location, and/or severity of a collision event of the vehicle 100. For example, the center accelerometer 118 is centrally located within the vehicle 100 that measures accelerations and/or vibrations of a body of the vehicle 100 to monitor for an occurrence, location, and/or severity of a collision event. In the illustrated example, the restraint control module 110 includes the center accelerometer 118 and is mounted to a vehicle floor of the vehicle 100 between a driver seat and a front-passenger seat. The front accelerometer 120 is located toward a front of the vehicle 100 that measures accelerations and/or vibrations of a front portion of the vehicle 100 to monitor for an occurrence, location, and/or severity of a collision event (e.g., a head-on collision, a rear-end collision). Additionally or alternatively, the vehicle includes a rear sensor located toward a rear of the vehicle 100 that measures accelerations and/or vibrations of a rear portion of the vehicle 100 to monitor for an occurrence, location, and/or severity of a head-on collision and/or a rear-end collision. Further, the side accelerometers 122 are located on respective sides of the vehicle 100 and measure accelerations and/or vibrations of respective side portions of the vehicle 100 to monitor for an occurrence, location, and/or severity of a collision event (e.g., a side collision). In the illustrated example, the side accelerometers 122 are located within respective doors 124 of the vehicle 100 to monitor for side collisions that occur at and/or near the doors 124.

Additionally or alternatively, the restraint control module 110 of the illustrated example determines which, if any, of the airbags (e.g., the airbag 112, the airbag 116) to deploy based upon information collected via side pressure sensors 126. For example, the side pressure sensors 126 measure changes in pressure and/or vibrations of the respective side portions of the vehicle 100 to monitor for an occurrence, location, and/or severity of a collision event (e.g., a side collision). In the illustrated example, the side pressure sensors 126 are located within the respective doors 124 of the vehicle 100 to monitor for side collisions that occur at and/or near the doors 124.

Further, the restraint control module 110 may determine which, if any, of the airbags (e.g., the airbag 112, the airbag 116) to deploy based upon information collected via other sources. For example, the vehicle 100 includes cameras 128 that capture image(s) and/or video of portions of an exterior of the vehicle. The image(s) and/or video captured by the cameras 128 may be utilized to determine whether the vehicle 100 is involved in a collision event. In the illustrated example, the cameras 128 are located on respective side-view mirrors 130 to monitor respective side portions of the vehicle 100. Additionally or alternatively, the vehicle includes camera(s) location at other location(s) of the vehicle 100 to monitor other exterior portion(s) of the vehicle 100.

As illustrated in FIG. 1, the vehicle 100 also includes a windshield 132 (e.g., a front windshield) that is, for example, formed of laminated or safety glass. Further, the vehicle 100 includes a vibration sensor 134 that is coupled to the windshield 132. For example, the vibration sensor 134 is rigidly mounted to an interior surface of the windshield 132. In other examples, the vibration sensor 134 is rigidly mounted to an exterior surface of the windshield 132 and/or is embedded within the windshield 132. Further, in some examples, the vibration sensor 134 is coupled to the windshield 132 along an edge of the windshield 132 to prevent the vibration sensor 134 from obstructing a view of a driver and/or other occupant of the vehicle 100. For example, the vibration sensor 134 is mounted to the windshield 132 proximate to a rearview mirror that is mounted to the windshield 132.

The vibration sensor 134 of the illustrated example is configured to measure vibrations of the windshield 132 that are caused by sound waves (e.g., high-pressure sound waves) impinging upon the windshield 132. For example, sound waves travelling through a medium, such as the windshield 132 of the vehicle 100, cause the medium to oscillate and/or vibrate. The vibration sensor 134 measures these vibrations caused by the sound waves when the sound waves (e.g., high pressure waves) impinge upon the windshield 132 and generates an electrical signal that corresponds to the measured vibrations of the windshield 132. The electrical signal may be subsequently processed and/or analyzed to determine the sound waves that impinged upon the windshield 132. That is, the windshield 132 and the vibration sensor 134 form a microphone in which the windshield 132 functions as a diaphragm of the microphone.

The vibration sensor 134 of the illustrated example is configured to measure vibrations that are perpendicular to a plane of the windshield 132 to enable the vibration sensor 134 and the windshield 132 to function as a microphone. Further, the vibration sensor 134 is configured to measure a wide frequency range of sound, for example, to enable detection of collision events and non-collision events. For example, the vibration sensor 134 is an accelerometer, (e.g., a uni-axial accelerometer, a tri-axial accelerometer, a micromachined accelerometer, a piezoelectric accelerometer, etc) that is capable wide frequency range of sound by monitoring vibrations of the windshield 132.

Further, while the vibration sensor 134 of the illustrated example are located on the windshield 132, one or more vibration sensors (e.g., the vibration sensor 134) may be coupled to other window(s) of the vehicle 100 that are capable of functioning as a diaphragm of a microphone upon being impinged upon by sound waves (e.g., high-pressure sound waves). For example, the vibration sensor 134 is coupled to a window formed of laminated glass (e.g., a rear windshield) and/or a window formed of non-laminated, tempered glass (e.g., one or more side windows, a moon roof) that is capable of functioning as a diaphragm of a microphone.

Further, as illustrated in FIG. 1, the vehicle 100 includes a rain/wiper sensor 136. The rain/wiper sensor 136 is configured to measure vibrations of the windshield 132 that are caused by rain drops and/or other precipitation contacting the windshield and/or by windshield wipers sliding along the windshield 132.

As illustrated in FIG. 1, the vehicle also includes a collision detector 138 of the restraint control module 110. For example, the collision detector 138 detects an event based upon window vibrations of the windshield 132. For example, based upon the window vibrations detected by the vibration sensor 134, the collision detector 138 identifies sound waves that correspond to the window vibrations. In some examples, the collision detector 138 compares the window vibrations detected by the vibration sensor 134 to the vibrations detected by the rain/wiper sensor 136 to enable the collision detector 138 to identify the window vibrations that are caused by the sound waves and, thus, to identify the sound waves caused by the event.

Further, the collision detector 138 of the restraint control module 110 determines whether the event is a collision event or a non-collision event upon comparing the window vibrations measured by the vibration sensor 134 to vehicle body vibrations measured by the center accelerometer 118, the front accelerometer 120, one or more of the side accelerometers 122, and/or one or more of the side pressure sensors 126. For example, to determine whether the event is a collision event or a non-collision event, the collision detector 138 compares frequencies of the window vibrations to frequencies of the vehicle body vibrations over a predetermined period of time after the event has initiated. In some examples, the collision detector 138 determines whether the event is a collision event or a non-collision event further based upon image(s) and/or video captured by one or more of the cameras 128 and/or based upon information collected via V2V and/or V2X communication.

Upon determining that the event is a collision event in which the frequencies of the vehicle body vibrations and/or the window vibrations exceed a frequency threshold, the collision detector 138 of the restraint control module 110 sends signal(s) to deploy one or more airbags of the vehicle 100 (e.g., the airbag 112, the airbag 116). Upon determining that the event is a collision event in which the frequencies of the vehicle body vibrations and/or the window vibrations do not exceed the frequency threshold, the collision detector 138 does not send signal(s) to deploy an airbag of the vehicle 100. That is, the frequency threshold corresponds to a severity of a collision event. Collision events corresponding to frequencies less than or equal to the frequency threshold are less severe and do not trigger deployment of the airbags. Collision events corresponding to frequencies greater than the frequency threshold are more severe and trigger deployment of the airbags. Further, the collision detector 138 does not send signal(s) to deploy an airbag of the vehicle 100 upon determining that the event is a non-collision event, regardless of whether the vibration frequencies are greater than the frequency threshold, to prevent the airbags from deploying when the vehicle 100 is not involved in a collision event.

Figure 2:
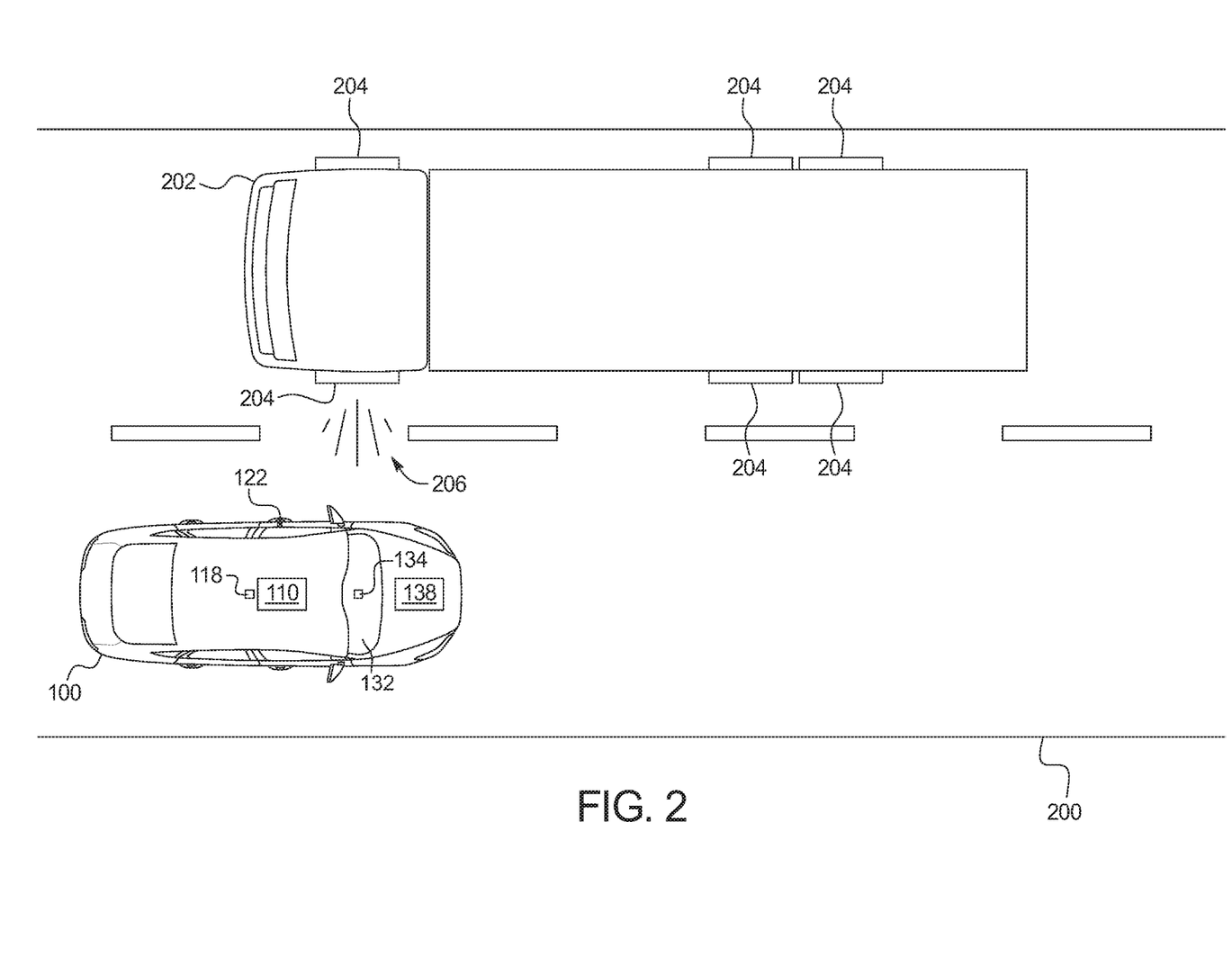
FIG. 2 illustrates a non-collision event occurring next to the vehicle of FIG. 1.

FIG. 2 illustrates a non-collision event occurring next to the vehicle 100. In the illustrated example, the non-collision event is a blowout of the tire of a nearby vehicle. For example, the vehicle 100 is travelling along a road 200 next to a semi-truck 202 that includes a plurality of tires 204. One of the tires 204 becomes punctured, which emits sound waves 206 in a direction toward the vehicle 100.

In the illustrated example, the vibration sensor 134 coupled to the windshield 132 detects the windshield vibrations caused by the sound waves 206 emitted by the punctured one of the tires 204 to enable the collision detector 138 of the restraint control module 110 to determine whether the vehicle 100 is involved in a collision event or a non-collision event. For example, the sound waves 206 cause vibrations within the vehicle body of the vehicle 100 that are detected by the center accelerometer 118, one of the side accelerometers 122 adjacent to the semi-truck 202, and/or one of the side pressure sensors 126 adjacent to the semi-truck 202. In some instances the puncturing of the one of the tires 204 is so loud that the vehicle body vibrations caused by the sound waves 206 exceed the vibration threshold.

To prevent the airbags (e.g., the airbag 112, the airbag 116) of the vehicle 100 from being deployed for the non-collision event, the collision detector 138 of the restraint control module 110 also monitors the window vibrations of the windshield 132 that are measured by the vibration sensor 134. Further, the collision detector 138 detects that an event has occurred based upon the window vibrations detected by the vibration sensor 134. Further, the collision detector 138 compares frequencies of the window vibrations of the windshield 132 to frequencies of the vehicle body vibrations of the vehicle 100 to determine whether the detected event is a collision event or a non-collision.

In the illustrated example, the collision detector 138 determines that the detected event is a non-collision event based upon the comparison of the windshield vibrations and the vehicle body vibrations caused by the sound waves 206. In other examples, the collision detector 138 determines that the detected event is a collision event based upon the comparison of windshield vibrations caused by sound waves and vehicle body vibrations caused by a collision. In some examples, upon determining that the event is a collision event, the collision detector 138 determines a collision event types based upon the comparison of windshield vibrations caused by sound waves and vehicle body vibrations. For example, the collision detector 138 determines whether the collision event is a head-on collision and/or a rear-end collision based upon the vibrations detected via the center accelerometer 118, the vibration sensor 134, and/or the front accelerometer 120. The collision detector 138 determines whether the collision event is a side collision and/or a rear-end collision based upon the vibrations detected via the center accelerometer 118, the vibration sensor 134, and/or one or more of the side accelerometers 122 and/or the side pressure sensors 126. Further, in some examples, the collision detector 138 may identify another source of sound waves (e.g., a person, an animal, a car horn, etc.) based upon the vibrations of detected via the vibration sensor 134.

Figure 3:
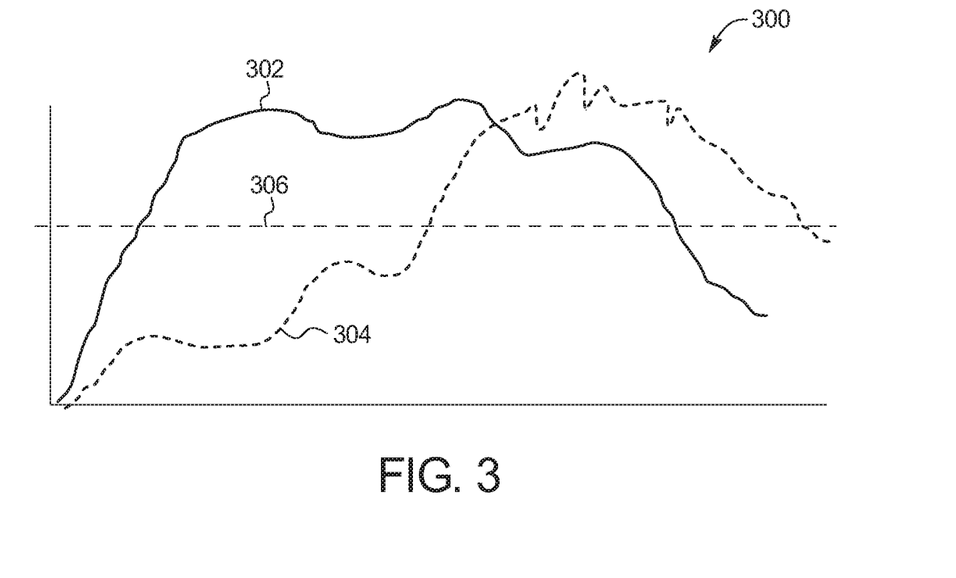
FIG. 3 depicts a graph representing a non-collision event as detected via the vehicle of FIG. 1.

FIG. 3 depicts a graph 300 representing a non-collision event as detected via the collision detector 138 of the vehicle 100. In the illustrated example, the x-axis of the graph 300 represents a predetermined time period after an event is initiated, and the y-axis of the graph 300 represents frequencies of sound waves. The graph 300 includes a line 302 that represents frequencies of windshield vibrations throughout the predetermined period of time, another line 304 that represents frequencies of vehicle body vibrations throughout the predetermined period of time, and another line 306 that represents a threshold frequency. For example, the line 302 represents the frequencies of windshield vibrations that are detected by the vibration sensor 134, and the line 304 represents the frequencies of vehicle body vibrations that are detected by the center accelerometer 118, the front accelerometer 120, one or more of the side accelerometers 122, and/or one or more of the side pressure sensors 126.

As illustrated in FIG. 3, during and/or immediately after a non-collision event, the frequencies of the windshield vibrations (line 302) increase to the threshold frequency (line 306) before the frequencies of the vehicle body vibrations (line 304) increase to the threshold frequency (line 306). Further, the frequencies of the windshield vibrations (line 302) increase to a respective maximum frequency before the frequencies of the vehicle body vibrations (line 304) increase to a respective maximum frequency. Accordingly, upon identifying that the frequencies of the windshield vibrations (line 302) and/or the frequencies of the vehicle body vibrations (line 304) have increased to the threshold frequency (line 306), the collision detector 138 of the restraint control module 110 determines that a non-collision event has occurred in response to identifying that (1) the frequencies of the windshield vibrations (line 302) have increased to the threshold frequency (line 306) before the frequencies of the vehicle body vibrations (line 304) have increased to the threshold frequency (line 306) and/or (2) the frequencies of the windshield vibrations (line 302) have increased to a respective maximum frequency before the frequencies of the vehicle body vibrations have increased to a respective maximum frequency.

Figure 4:
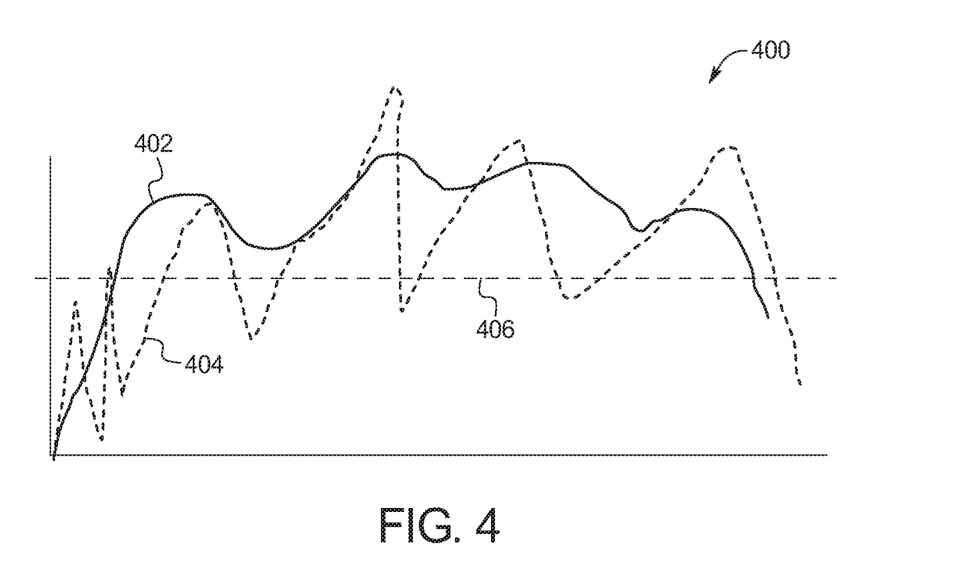
FIG. 4 depicts a graph representing a collision event as detected via the vehicle of FIG. 1.

FIG. 4 depicts a graph 400 representing a collision event as detected via the collision detector 138 of the vehicle 100. In the illustrated example, the x-axis of the graph 400 represents a predetermined time period after an event is initiated, and the y-axis of the graph 300 represents frequencies of sound waves. The graph 300 includes a line 402 that represents frequencies of windshield vibrations throughout the predetermined period of time, another line 404 that represents frequencies of vehicle body vibrations throughout the predetermined period of time, and another line 406 that represents a threshold frequency (e.g., the threshold frequency represented by the line 306 of FIG. 3). For example, the line 402 represents the frequencies of windshield vibrations that are detected by the vibration sensor 134, and the line 404 represents the frequencies of vehicle body vibrations that are detected by the center accelerometer 118, the front accelerometer 120, one or more of the side accelerometers 122, and/or one or more of the side pressure sensors 126.

As illustrated in FIG. 4, during and/or immediately after a non-collision event, the frequencies of the windshield vibrations (line 402) track and/or align with the frequencies of the vehicle body vibrations (line 404) throughout the predetermined time period after the initiation of the event. That is, the relative maximums of the frequencies of the windshield vibrations (line 402) and the relative maximums of the frequencies of the vehicle body vibrations (line 404) occur at substantially similar times, and the relative minimums of the frequencies of the windshield vibrations (line 402) and the relative minimums of the frequencies of the vehicle body vibrations (line 404) occur at substantially similar times. Further, the frequencies of the vehicle body vibrations (line 404) increase to the threshold frequency (line 406) before the frequencies of the window vibrations (line 402) increase to the threshold frequency (line 406).

Accordingly, upon identifying that the frequencies of the windshield vibrations (line 402) and/or the frequencies of the vehicle body vibrations (line 404) have increased to the threshold frequency (line 406) during the predetermined time period, the collision detector 138 of the restraint control module 110 determines that a collision event has occurred in response to identifying that (1) the frequencies of the vehicle vibrations (line 404) have increased to the threshold frequency (line 406) before the frequencies of the windshield vibrations (line 402) have increased to the threshold frequency (line 306) and/or (2) the frequencies of the windshield vibrations (line 402) track and/or align with the frequencies of the vehicle body vibrations (line 404) throughout the predetermined time period.

Figure 5:
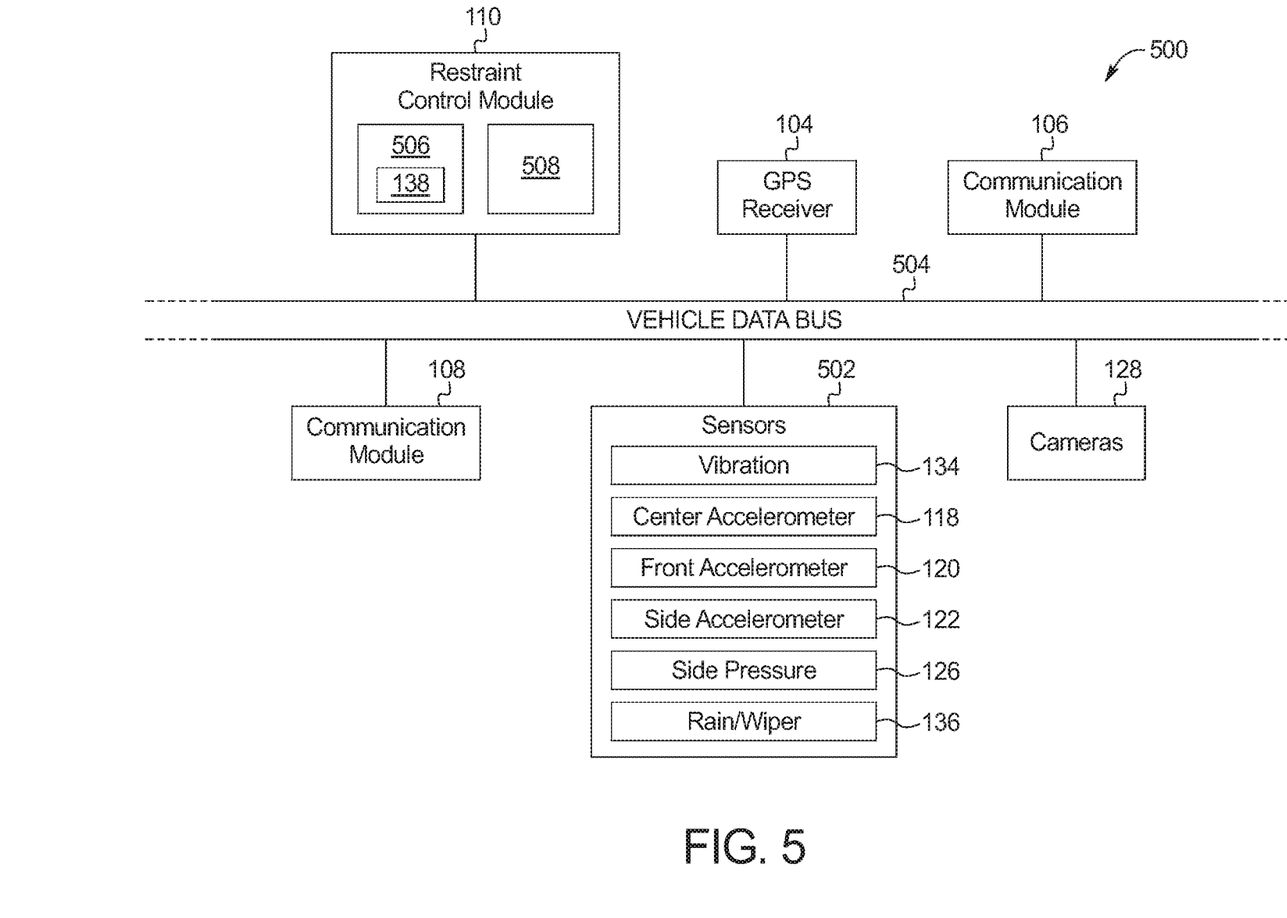
FIG. 5 is a block diagram of electronic components of the vehicle of FIG. 1.

FIG. 5 is a block diagram of electronic components 500 of the vehicle 100. As illustrated in FIG. 5, the electronic components 500 include the restraint control module 110, the GPS receiver 104, the communication module 106, sensors 502, the cameras 128, and a vehicle data bus 504.

The restraint control module 110 includes a microcontroller unit, controller or processor 506 and memory 508. In some examples, the processor 506 of the restraint control module 110 is structured to include the collision detector 138. Alternatively, in some examples, the collision detector 138 is incorporated into another electronic control unit (ECU) with its own processor 506 and memory 508. The processor 506 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 508 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 508 includes multiple kinds of memory, particularly volatile memory and non-volatile memory.

The memory 508 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 508, the computer readable medium, and/or within the processor 506 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 502 are arranged in and around the vehicle 100 to monitor properties of the vehicle 100 and/or an environment in which the vehicle 100 is located. One or more of the sensors 502 may be mounted to measure properties around an exterior of the vehicle 100. Additionally or alternatively, one or more of the sensors 502 may be mounted inside a cabin of the vehicle 100 or in a body of the vehicle 100 (e.g., an engine compartment, wheel wells, etc.) to measure properties in an interior of the vehicle 100. For example, the sensors 502 include accelerometers, odometers, tachometers, pitch and yaw sensors, wheel speed sensors, microphones, tire pressure sensors, biometric sensors and/or sensors of any other suitable type. In the illustrated example, the sensors 502 include the vibration sensor 134, the center accelerometer 118, the front accelerometer 120, the side accelerometers 122, the side pressure sensors 126, and the rain/wiper sensor 136.

The vehicle data bus 504 communicatively couples the GPS receiver 104, the communication module 106, the communication module 108, the restraint control module 110, the cameras 128, and the sensors 502. In some examples, the vehicle data bus 504 includes one or more data buses. The vehicle data bus 504 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
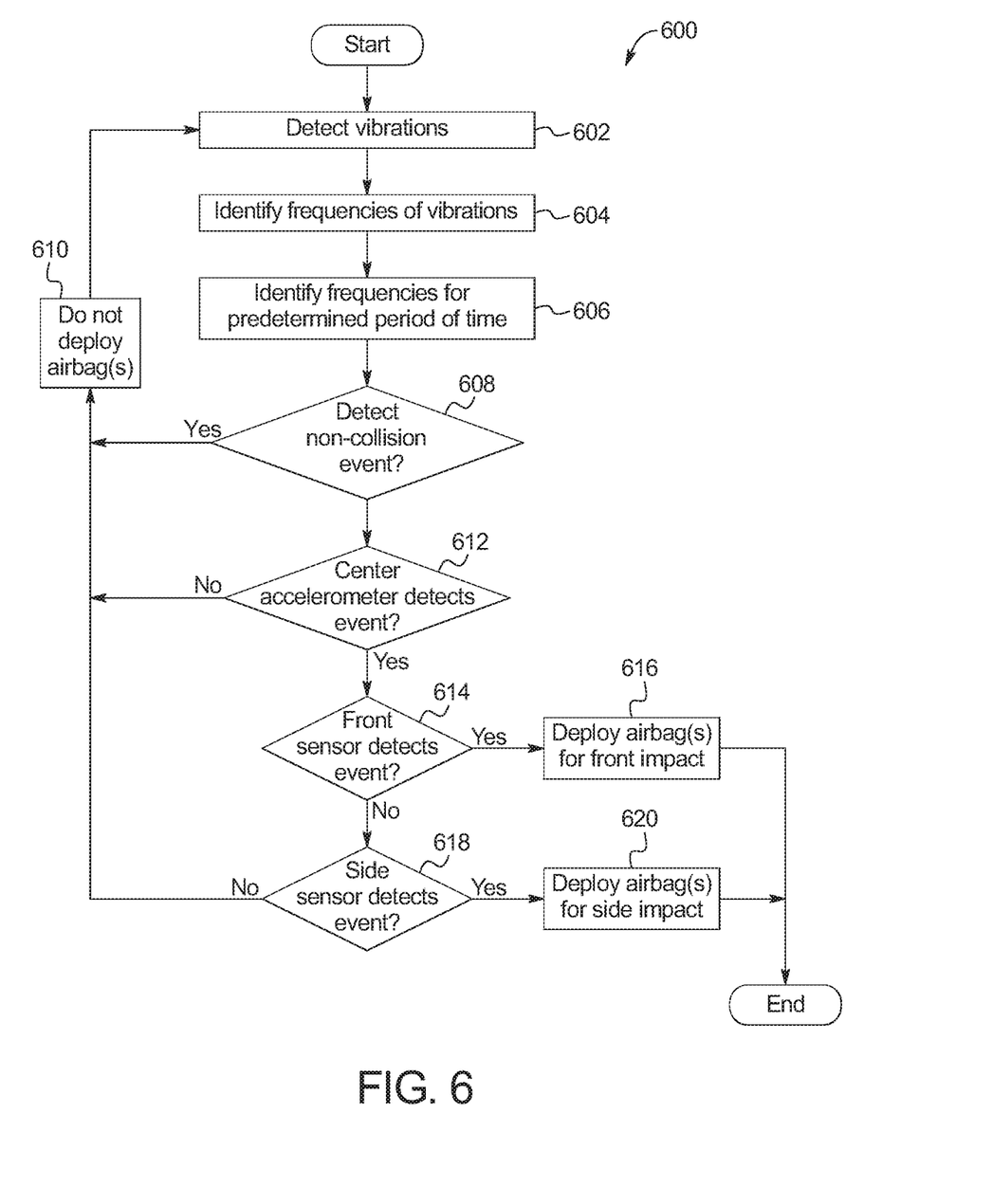
FIG. 6 is a flowchart for identifying collision events and non-collision events via a window vibration sensor in accordance with the teachings herein.

FIG. 6 is a flowchart of an example method 600 to identify collision events and non-collision events via a window vibration sensor in accordance with the teachings herein. The flowchart of FIG. 6 is representative of machine readable instructions that are stored in memory (such as the memory 508 of FIG. 5) and include one or more programs which, when executed by a processor (such as the processor 506 of FIG. 5), cause the vehicle 100 to implement the example collision detector 138 of FIGS. 1 and 5. While the example program is described with reference to the flowchart illustrated in FIG. 6, many other methods of implementing the example collision detector 138 may alternatively be used. For example, the order of execution of the blocks may be rearranged, changed, eliminated, and/or combined to perform the method 600. Further, because the method 600 is disclosed in connection with the components of FIGS. 1-5, some functions of those components will not be described in detail below.

Initially, at block 602, the vibration sensor 134 detects window vibrations of a window of the vehicle 100 (e.g., windshield vibrations of the windshield 132), and the center accelerometer 118, the front accelerometer 120, one or more of the side accelerometers 122, and/or one or more of the side pressure sensors 126 detect vehicle body vibrations of the vehicle 100. At block 604, the vibration sensor 134 and/or the restraint control module 110 (e.g., the collision detector 138 of the restraint control module 110) identifies frequencies of the window vibrations. Further, at 606, the collision detector 138 of the restraint control module 110 collects the frequencies of the window vibrations and the vehicle body vibrations for a predetermined period of time.

At block 608, the collision detector 138 of the restraint control module 110 determines whether a non-collision event is detected based upon the frequencies of the window vibrations and/or the frequencies of the vehicle body vibrations. For example, the collision detector 138 detects that a non-collision event has occurred upon comparing the frequencies of the window vibrations and/or the vehicle body vibrations to a threshold frequency for the predetermined period of time. In response to the collision detector 138 detecting that a non-collision event has occurred, the method 600 proceeds to block 610 at which the restraint control module 110 does not send signal(s) to deploy airbag(s) (e.g., the airbag 112, the airbag 116) of the vehicle 100. Otherwise, the method 600 proceeds to block 612.

At block 612, the collision detector 138 of the restraint control module 110 determines whether the center accelerometer 118 detects that a collision event has occurred. For example, the collision detector 138 compares the frequencies of the window vibrations detected by the vibration sensor 134 to the frequencies of the vehicle body vibrations detected by the center accelerometer 118 to determine whether the center accelerometer 118 has detected a collision event. In response to the collision detector 138 determining that the center accelerometer 118 has not detected a collision event, the method 600 proceeds to block 610. Otherwise, in response to the collision detector 138 determining that the center accelerometer 118 has detected a collision event, the method 600 proceeds to block 614.

At block 614, the collision detector 138 of the restraint control module 110 determines whether the front accelerometer 120 detects that a collision event (e.g., a head-on collision, a rear-end collision) has occurred. For example, the collision detector 138 compares the frequencies of the window vibrations detected by the vibration sensor 134 to the frequencies of the vehicle body vibrations detected by the front accelerometer 120 to determine whether the front accelerometer 120 has detected a collision event. In response to the collision detector 138 determining that the front accelerometer 120 has detected a collision event, the method 600 proceeds to block 616 at which the restraint control module 110 sends signal(s) to deploy airbag(s) (e.g., the airbag 112, the airbag 116) of the vehicle 100 for a front and/or rear impact. Otherwise, in response to the collision detector 138 determining that the front accelerometer 120 has not detected a collision event, the method 600 proceeds to block 618.

At block 618, the collision detector 138 of the restraint control module 110 determines whether one or more of the side accelerometers 122 and/or the side pressure sensors 126 detect that a collision event (e.g., a side collision) has occurred. For example, the collision detector 138 compares the frequencies of the window vibrations detected by the vibration sensor 134 to the frequencies of the vehicle body vibrations detected by one or more of the side accelerometers 122 and/or the side pressure sensors 126 to determine whether one or more of the side accelerometers 122 and/or the side pressure sensors 126 has detected a collision event. In response to the collision detector 138 determining that one or more of the side accelerometers 122 and/or the side pressure sensors 126 has detected a collision event, the method 600 proceeds to block 620 at which the restraint control module 110 sends signal(s) to deploy airbag(s) (e.g., the airbag 112, the airbag 116) of the vehicle 100 for a side impact. Otherwise, in response to the collision detector 138 determining that one or more of the side accelerometers 122 and/or the side pressure sensors 126 has not detected a collision event, the method 600 proceeds to block 610.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a window;
   a first sensor coupled to the window to detect window vibrations of the window;
   a second sensor to detect vehicle body vibrations of a vehicle body; and
   a restraint control module to:
      detect an event based upon the window vibrations; and
      determine whether the event is a collision event or a non-collision event responsive to comparing the window vibrations and the vehicle body vibrations.

2. The vehicle of claim 1, wherein the window vibrations detected by the first sensor correspond to sound waves caused by the event.

3. The vehicle of claim 2, further including a rain/wiper sensor that detects vibrations of the window caused by at least one of precipitation and windshield wipers to enable the window vibrations corresponding to the sound waves of the event to be identified.

4. The vehicle of claim 1, further including an airbag, the restraint control module sends a signal to deploy the airbag responsive to determining that the event is the collision event and does not send the signal to deploy the airbag responsive to determining that the event is the non-collision event.

5. The vehicle of claim 1, wherein the non-collision event includes a blowout of a tire of a nearby vehicle.

6. The vehicle of claim 1, wherein the first sensor is a piezoelectric accelerometer.

7. The vehicle of claim 1, wherein the restraint control module includes the second sensor and is mounted to a vehicle floor between a driver seat and a front-passenger seat.

8. The vehicle of claim 1, wherein the restraint control module determines whether the event is the collision event or the non-collision event by comparing frequencies of the window vibrations and frequencies of the vehicle body vibrations for a predetermined time period after the event has initiated.

9. The vehicle of claim 8, wherein the restraint control module determines that the event is the collision event responsive to identifying the frequencies of the vehicle body vibrations increase to a threshold frequency before the frequencies of the window vibrations increase to the threshold frequency.

10. The vehicle of claim 8, wherein the restraint control module determines that the event is the non-collision event responsive to identifying at least one of:
    the frequencies of the window vibrations increase to a threshold frequency before the frequencies of the vehicle body vibrations increase to the threshold frequency; and
    the frequencies of the window vibrations increase to a respective maximum frequency before the frequencies of the vehicle body vibrations increase to a respective maximum frequency.

11. The vehicle of claim 1, further including a front accelerometer configured to further detect the vehicle body vibrations.

12. The vehicle of claim 11, wherein, in response to determining that the event is the collision event, the restraint control module is to determine whether the collision event is at least one of a head-on collision and a rear-end collision via the front accelerometer.

13. The vehicle of claim 1, further including at least one of a side accelerometer and a side pressure sensor configured to further detect the vehicle body vibrations.

14. The vehicle of claim 13, wherein, in response to determining that the event is the collision event, the restraint control module is to determine whether the collision event is a side collision via the at least one of the side accelerometer and the side pressure sensor.

15. The vehicle of claim 1, further including a camera located on a side-view mirror, wherein the restraint control module is to determine whether the event is the collision event or the non-collision event further based on images captured by the camera.

16. The vehicle of claim 1, further including a communication module configured to communicate with another vehicle via vehicle-to-vehicle communication, wherein the restraint control module is to determine whether the event is the collision event or the non-collision event further based on information collected via vehicle-to-vehicle communication.

17. A method comprising:
    detecting window vibrations of a window via a first sensor coupled to the window;
    detecting vehicle body vibrations of a vehicle body via a second sensor;
    detecting, via a processor, an event based upon the window vibrations; and
    determining, via the processor, whether the event is a collision event or a non-collision event responsive to comparing the window vibrations and the vehicle body vibrations.

18. The method of claim 17, further including comparing frequencies of the window vibrations and frequencies of the vehicle body vibrations for a predetermined time period after the event to determine whether the event is the collision event or the non-collision event.

19. The method of claim 18, further including determining that the event is the collision event responsive to identifying the frequencies of the vehicle body vibrations increase to a threshold frequency before the frequencies of the window vibrations increase to the threshold frequency.

20. The method of claim 18, further including determining that the event is the non-collision event responsive to identifying at least one of:
the frequencies of the window vibrations increase to a threshold frequency before the frequencies of the vehicle body vibrations increase to the threshold frequency; and
the frequencies of the window vibrations increase to a respective maximum frequency before the frequencies of the vehicle body vibrations increase to a respective maximum frequency.

* * * * *